Feb. 9, 1932.  A. H. WOLFE  1,844,734
SAW SET
Filed Sept. 26, 1928
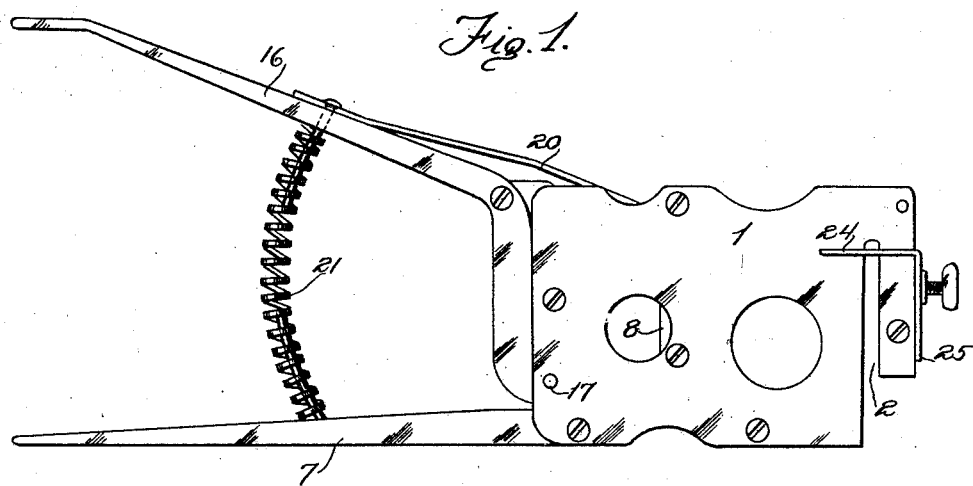
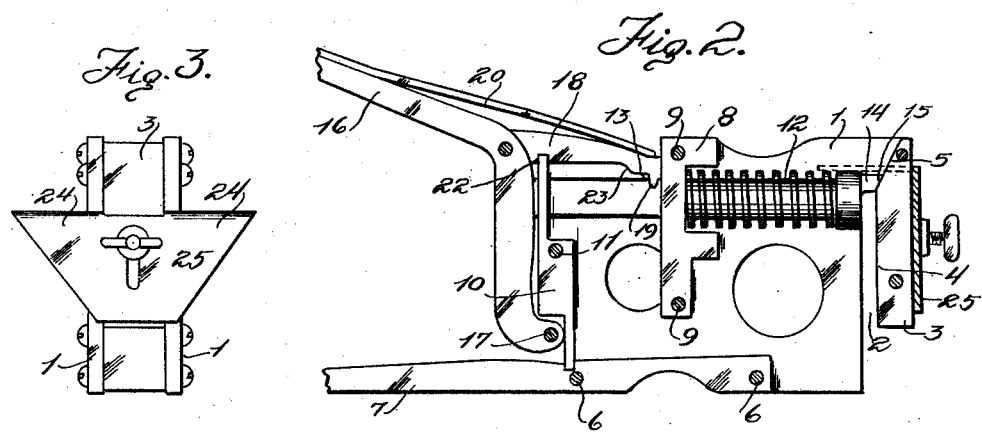
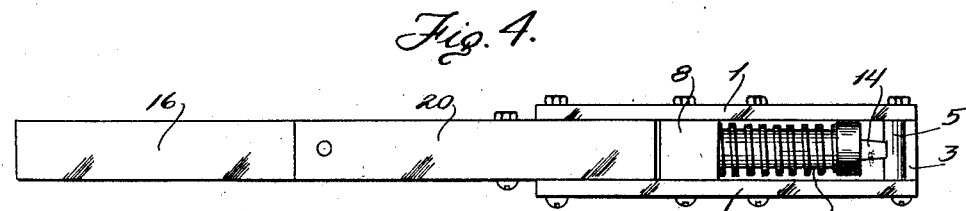
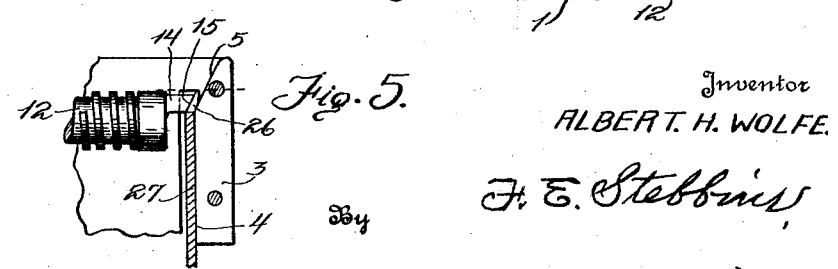
Inventor
ALBERT H. WOLFE.
F. E. Stebbins
By
Attorney Patented Feb. 9, 1932

1,844,734

UNITED STATES PATENT OFFICE

ALBERT H. WOLFE, OF SANTA ROSA, CALIFORNIA

SAW SET

Application filed September 26, 1928. Serial No. 308,460.

The main object of my invention is the provision of means for setting the teeth of saws so that when set all the teeth of a saw will be uniformly disposed at the same angle to the plane of the body of the saw.

A further object is the provision of a device for the above mentioned purpose which shall be of simple construction and easy to manipulate by the ordinary skilled mechanic.

My invention consists in certain novelties of construction and in the combination of parts as herein set forth and claimed.

The accompanying drawings illustrate an example of the embodiment of my invention, the parts being constructed and combined according to the best mode of procedure I have so far devised for the purpose.

Figure 1 is a side view in elevation of a device embodying my invention.

Figure 2 is a side view in elevation of the essential parts of Figure 1 with one of the side plates removed.

Figure 3 is an end view of Figure 1 illustrating the adjustable aligning plate for the saw teeth.

Figure 4 is a top plan view of Figure 1.

Figure 5 is a fragmentary view, showing part of a saw in section and one tooth thereof set at an angle to the plane of the body of the saw by a blow delivered by the reciprocating plunger or hammer.

The device, as a whole, includes a metallic frame having a slot to receive part of a saw body having the teeth, an anvil adjacent the slot, a spring-actuated plunger having a head adapted to engage a saw tooth, a lever and tripping means for drawing the plunger from its seat and releasing the same, and an adjustable aligning plate for the teeth of the saw when the teeth are being set.

Referring to the figures, 1, 1 designate the side plates of the frame; 2, 2, the parallel slots in the plate; 3 is the anvil located between the ends of the plates and adjacent the slots therein; 4, the vertical surface of the anvil; and 5 is the surface of the anvil obliquely disposed to the said vertical surface and against which oblique surface the tooth of a saw is bent or upset when struck by the plunger. The anvil is secured in position between the plates by bolts and nuts or rivets, as shown.

Between the lower edges of the plates is secured by suitable bolts and nuts 6, 6 a handle 7 projecting beyond the plates. Midway between the plates is a perforated bearing block 8 secured between the plates by bolts 9, and also between the plates at the left is a perforated bearing and tripping block 10 having its lower end within a seat or recess in the top surface of the handle and the body perforated to receive a bolt 11 which passes through the plates and holds the block in fixed position.

The movable parts of the device or machine are: the reciprocating plunger 12 movable within the perforations or bearings in the blocks 8 and 10, provided with a notch 13, and having a head 14 the end oblique surface 15 of which is adapted to contact with the side of a saw tooth; a helical spring on the plunger 12 bearing against the block 8 at one end and a seat on the plunger at the opposite end; a lever 16 pivoted at one end by bolt 17 between the plates and pivotally supporting and carrying trigger 18 having a projection 19 engaging the notch 13 in the top surface of the plunger, the trigger being held in engagement with the plunger by a leaf spring 20 carried by the lever, as shown; and a coiled spring 21 suitably supported between the handle and lever arm, as indicated by the drawings, to hold the lever in its normal position.

It will be observed that the under surface of the trigger at 22 bears against the top end of the block 10 and that at point 23 the metal extends downwardly to form a downwardly curved surface, which, when it comes in contact with the top surface of the block 10 as the lever is depressed, throws the trigger upwardly and releases the spring-actuated plunger.

In using the device the saw is firmly secured in a vise with the teeth extended upwardly. The setting device is adjusted to the saw so the upper part of the body thereof, the toothed edge, is disposed within the slots in the plates, the teeth bearing against the under surfaces of the wings 24 of the adjustable aligning plate 25, which is adjustable vertically, as shown by Figure 3, so the teeth of a saw can be brought to proper positions relative to the anvil for receiving the blows of the plunger.

On reference to Figure 5 it will be clear that the tooth 26 of the saw body 27 is engaged by the head 14 of the reciprocating plunger, and that the tooth has been forced against the oblique surface 5 of the anvil. The dotted line indicates the under surfaces of the wings of the adjustable saw teeth aligning plate.

An important feature of the combination is the spring-actuated plunger which insures the delivery of a blow of uniform force or energy to each tooth of the saw whereby all the teeth are set at equal angles to the plane of the body of the saw.

Obviously, every other tooth is set relative to one surface of the saw, then the saw is turned end for end and the remaining teeth set relative to the other surface of the saw. The aligning device enables the machine to be used for setting the teeth of saws wherein the teeth are of different lengths.

What I claim is:

1. The combination in a saw tooth setting device, of a frame comprising two parallel slotted plates suitably united, an anvil rigidly located between and fixed to the plates, said anvil having a vertical surface adapted to be engaged by a side surface of a saw and also a surface oblique to said vertical surface and adapted to limit the arc through which a saw tooth can be bent, an aligning plate adjustable relative to the anvil, a reciprocating spring-actuated plunger suitably supported and having a head with a surface oblique to the longitudinal axis of the plunger, and means including a lever and trigger for retracting, holding, and releasing the plunger.

2. The combination in a saw tooth setting device, of a frame supporting an anvil, a slot in the frame to receive part of a saw, a spring-actuated plunger having means adapted to receive a trigger, means for supporting and guiding said plunger, a lever pivoted to the frame, a trigger pivoted to the lever and adapted to engage and draw back the plunger, and means carried by the frame and independent of the trigger and plunger for tripping said trigger and releasing the plunger.

3. The subject-matter of claim 2 wherein the frame is provided with a bearing for the said trigger, and the trigger is provided with a projecting surface, as 23, which is adapted to contact with the said bearing for the trigger and release the same from the plunger.

4. The combination in a saw tooth setting device, of an anvil rigidly supported by a frame, said anvil having a vertical surface or bearing adapted to be engaged by a side surface of a saw, and also a surface angularly disposed to said vertical surface or bearing adapted to be engaged by the side of a saw tooth; a reciprocating spring-actuated plunger suitably supported and having a head adapted to engage a saw tooth; means for retracting and releasing the plunger comprising a pivoted lever carrying a pivoted trigger which engages the plunger, and means independent of the plunger and trigger for tripping said trigger and releasing the plunger.

5. The combination in a saw setting device, of a frame comprising two slotted plates, a spring-actuated plunger, a handle, a pivoted lever, a trigger carried by said lever, and means for holding said trigger in engagement with said plunger; said plates having secured therebetween an anvil and a perforated block to guide said plunger, said block being provided at the edge with a bearing for said trigger.

In testimony whereof I affix my signature.

ALBERT H. WOLFE.